Jan. 24, 1956　　　A. FASHAY　　　2,732,095
EXPLOSION-PROOF GASOLINE TANK
Filed June 26, 1952
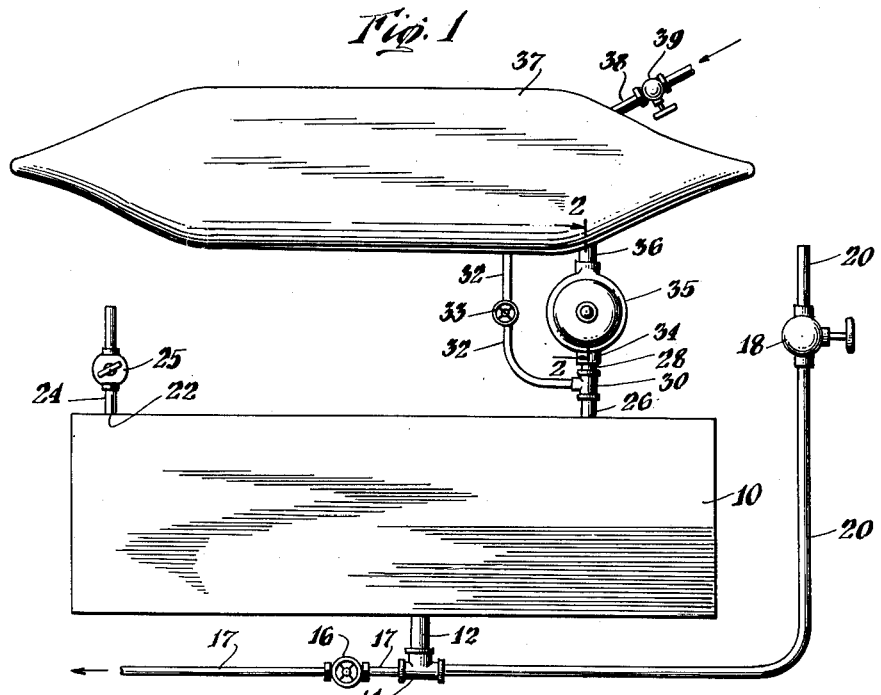
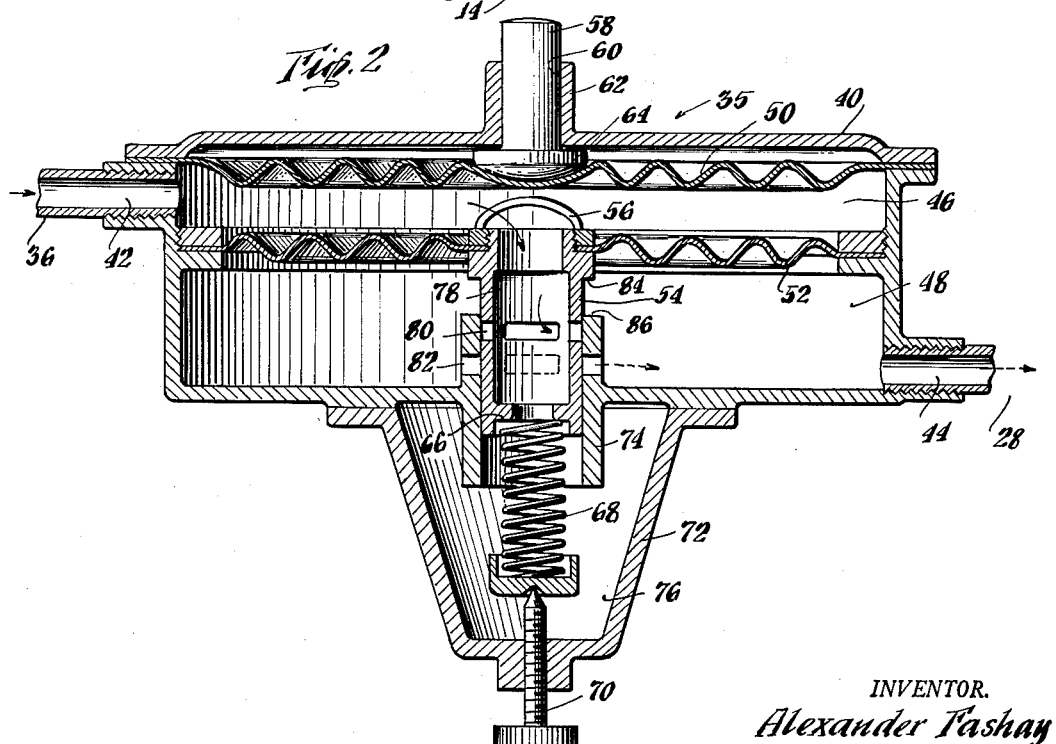
INVENTOR.
Alexander Fashay
BY
Leo C. Krazinski
ATTORNEY

United States Patent Office 2,732,095
Patented Jan. 24, 1956

2,732,095

EXPLOSION-PROOF GASOLINE TANK

Alexander Fashay, Long Island City, N. Y., assignor of thirty per cent to Leo C. Krazinski, New York, N. Y.

Application June 26, 1952, Serial No. 295,802

3 Claims. (Cl. 220—88)

My invention relates to fuel tanks, particularly to means for preventing formation of an explosive mixture in fuel tanks, and has for its primary object to eliminate air from fuel tanks and thereby avoid an explosive combination therein.

This object is accomplished by providing means for forming a non-explosive combination in the space above the level of the liquid fuel in a fuel tank for use on a stationary member or on an automotive vehicle, such as an airplane, automobile, tractor, tank, motor boat, ship, etc. I provide for this purpose a mechanism for admitting an inert gas, such as carbon dioxide, into the fuel tank and maintaining the space above the liquid fuel filled with the inert gas, regardless of consumption of the fuel. Further, when the fuel tank is empty, means are provided for storing the exhausted inert gas, thereby avoiding waste thereof.

Another object of my invention is to maintain a predetermined pressure in the fuel tank while preventing outside air from entering the tank as the liquid fuel is being consumed.

Still another object of the invention is to provide a container in which atmospheric pressure is employed for forcing fuel isolated from air into a combustion engine.

Still another object of the invention is to provide an improved regulating valve for accomplishing the above objects.

Other and further objects will be obvious upon an understanding of the illustrative embodiment about to be described, or will be indicated in the appended claims, and various advantages not referred to herein will occur to one skilled in the art upon employment of the invention in practice.

Fig. 1 is a diagrammatic view of a fuel tank with a filling tube entering the bottom and a flexible envelope containing an inert gas connected at the top through a regulating valve, and Fig. 2 is a sectional view taken along line 2—2 of Fig. 1 in the direction of the arrows showing the regulating valve.

Referring now to the drawing, particularly to Fig. 1, there is shown a tank 10 of any suitable construction adapted for storing fuel, such as gasoline. At the bottom of the tank is shown an inlet conduit 12 connected to the top leg of a T-shaped fitting 14, which has its left branch connected to a manually operable valve 16 included in a conduit 17, that leads to an engine (not shown), and which has its right branch connected to another manually operable valve 18 included in a filler conduit 20.

At the top left of the fuel tank 10 is shown an opening 22 connected to a conduit 24 containing a valve 25 for exhausting the air during initial filling of the fuel tank 10. At the upper right of the fuel tank is shown an opening 26 connected by a conduit 28 to the lower end of a T fitting 30, which in turn has its left branch coupled to a conduit 32 containing a valve 33 and its upper branch connected to the lower end 34 of my improved regulating valve 35, which will be described in greater detail hereinafter. Both the conduit 32 and regulating valve 35 via conduit 36 are connected to a flexible envelope 37, which contains a supply of inert gas, such as carbon dioxide. The flexible envelope 37 is also provided with a tube 38 containing a valve 39 at its upper side as an inlet for the inert gas. It will be readily seen that the conduit 32 interconnecting the fitting 30 and flexible container 37 is merely a by-pass for the regulating valve 35.

Referring now to Fig. 2, there is shown in detail my improved regulating valve 35 for maintaining a predetermined pressure in the fuel tank, as well as for maintaining a covering layer of the inert gas contiguous to the liquid fuel in the fuel tank. By keeping the inert gas substantially in contact with the liquid fuel and preventing access thereto of air, the opportunity of producing an explosive combination in the fuel tank is therefore eliminated. The valve 35 comprises a rigid casing 40 of circular configuration provided with an opening 42 for the conduit 36 and an opening 44 for the conduit 28 leading to the fuel tank 10. The casing 40 is subdivided into two separate compartments 46 and 48 by two flexible, annular diaphragms 50 and 52, the upper diaphragm 50 being continuous and secured at its periphery to the casing in any suitable manner. The diaphragm 52 is ring shaped in which the outer periphery is secured to the casing while the inner periphery is secured to a slidable sleeve 54.

At the upper end of the sleeve 54, which end is open, there is shown a rounded bridging member 56, preferably of round cross-section, secured thereto for cooperating engagement with a button 58 slidable in an opening 60 provided by a cylinder 62 on the upper side of the casing 40. The lower end of the button has an enlarged head 64 which is in bearing engagement with the upper diaphragm 50, so that the button is normally in its upper or raised position in view of the stretched condition of the diaphragm 50.

The lower end of the sleeve 54 is also open and has a seat 66 for one end of a coiled spring 68, the other end of which spring is seated at the inner end of an adjusting screw 70 threadedly supported by a sub-casing 72 sealed to the main casing 40. Adjusting screw 70 is adapted to impart the desired tension to the lower diaphragm 52. The outer wall of this sleeve is slidable in a cylinder 74 formed as part of the main casing 40, the upper part of the cylinder projecting into compartment 48 and the lower part thereof projecting into a compartment 76 formed by the sub-casing 72. It is to be noted that the compartment 76 is in communication with compartment 46 via passage 78 formed by the inner wall of the sleeve 54.

In the sleeve 54 are shown transverse openings 80 and in the cylinder 74 are shown similar transverse openings 82, which openings are adapted to register when the pressure in the fuel tank 10 is lower than the pressure in the envelope 37. It can be readily seen that registration of both openings 80 and 82 can be had by pushing the button 58 down against the diaphragm 50 and, in turn, the bridging member 56, whereupon the sleeve 54 is urged downwardly against the spring 68 until shoulder 84 on the sleeve strikes the top 86 of the cylinder 74.

The operation of the device will now be explained. Assuming that both the fuel tank 10 and the flexible envelope 37 are empty, the first step is to fill the envelope 37 with an inert gas, such as carbon dioxide. This is done by forcing under pressure carbon dioxide through the valve conduit 38 until the envelope 37 is filled. The next step is to exhaust any air that might be in the fuel tank and this is done first by closing valves 16, 18 and opening valves 25 and 33. Ingress of the inert gas into the top of the fuel tank will force air therefrom and out through the valved conduit 24. When all of the air has been exhausted from the fuel tank, the valves 25 and 33 are closed.

The next step is to fill the fuel tank with gasoline and this is accomplished by opening valve 18, valves 16, 25, and 33 being closed, and admitting fuel such as gasoline, into the tank 10. However, in order for the fuel to enter the tank it is necessary that the button 58 be depressed until openings 80 and 82 (Fig. 2) are in registration. Thus, as the gasoline enters the tank the carbon dioxide therein is correspondingly exhausted from the fuel tank through the valve 35 via compartment 48, openings 82, openings 80 through passage 78 in the sleeve, compartment 46 and thence via conduit 36 into the flexible envelope 37. As the filling operation progresses the carbon dioxide in the fuel tank diminishes, but it is to be noted that the upper layer of the gasoline is always bounded by a layer of the inert gas. When the tank is substantially filled, the button 58 is released, the fuel inlet valve 18 is closed, and valve 16 connecting the fuel tank with the engine is opened. As the engine utilizes the fuel, the suction created in the tank by withdrawal of the fuel lowers the pressure between the two compartments and automatically causes registration of the two openings 80 and 82 and thereby enables additional carbon dioxide to flow into the fuel tank to replace the space occupied by the utilized gasoline. A layer of inert gas is therefore continually present above the gasoline at substantially atmospheric pressure.

What is claimed is:

1. In a fuel tank explosion preventive device of the type having a fuel tank sealed from the atmosphere, a flexible envelope containing a supply of inert gas, conduit means including a manually operable valve for initially conveying inert gas from said flexible envelope to said tank when the latter is empty, second conduit means including a differential valve for controlling inert gas flow, said differential valve comprising a rigid casing, a pair of flexible diaphragms in said casing for providing two compartments therein, one compartment in direct communication with said envelope and the other compartment in direct communicatoin with the fuel tank, means including a cylinder having at least one transverse opening in said casing and a sleeve having at least one transverse opening slidable in said cylinder for controlling communication between said compartments, said sleeve being rigidly secured at one end thereof to an intermediate portion of one of said diaphragms and thus movable therewith, a spring for urging the other end of said sleeve into a valve closing position whereby said transverse openings are normally out of registration, and manually operated means for urging said sleeve into a valve opening position whereby said transverse openings are placed in registration and communication is established between said compartments and in turn between said envelope and fuel tank.

2. Means for preventing formation of an explosive mixture in a fuel tank sealed from the atmosphere comprising a flexible envelope containing a source of an inert gas at a predetermined pressure, conduit means for interconnecting said flexible envelope and said fuel tank, differential valve means in said conduit means including a casing, a pair of flexible diaphragms in said casing for providing two compartments therein, one compartment in direct communication with said envelope and the other compartment in direct communication with the fuel tank, a cylinder having at least one transverse opening rigidly disposed in said casing, a sleeve having at least one transverse opening slidable in said cylinder, one end of said sleeve being rigidly secured to an intermediate portion of one of said diaphragms and thus movable therewith, a spring for urging the other end of said sleeve into a valve closing position whereby said transverse openings are out of registration, said transverse openings registering to open said valve when the pressure in said fuel tank is lower than the pressure in the envelope and thereby establishing communication between the envelope and the fuel tank, and manually operated means for urging said sleeve into a valve opening position.

3. In a fuel tank explosion preventive device of the type having a fuel tank sealed from the atmosphere, a flexible envelope containing a supply of inert gas under pressure, conduit means for initially conveying the inert gas from said envelope to said tank when the tank is empty and for returning said inert gas to said envelope as said tank is being filled with fuel, a differential valve in series with said conduit means for controlling inert gas flow including a casing, a pair of spaced flexible diaphragms secured at their peripheries to said casing for subdividing the casing into two compartments, one compartment in direct communication with said fuel tank and the other compartment in direct communication with said envelope, an open ended cylinder in said casing having transverse openings leading to said one compartment, a spring biased sleeve having transverse openings leading to the other compartment slidable in said cylinder, one end of said sleeve being rigidly secured to an intermediate position of one of said diaphragms and thus movable therewith, said openings of said cylinder and sleeve being normally out of register but being adapted to register when the pressure in said fuel tank is lower than the pressure in the envelope, and manual means including a button slidable in said casing for moving said sleeve to cause registration of said openings.

References Cited in the file of this patent

UNITED STATES PATENTS

| 385,941 | McCarthy | July 10, 1888 |
| 877,003 | Schulze | Jan. 21, 1908 |
| 1,172,884 | Gungerich | Feb. 22, 1916 |
| 1,533,309 | Durborow | Apr. 14, 1925 |
| 2,341,268 | Davis, Jr. | Feb. 8, 1944 |

FOREIGN PATENTS

| 452,542 | Germany | Nov. 12, 1927 |